Oct. 18, 1949.                C. W. REDEKOPP                2,484,959
                           ELECTRIC WELDING APPARATUS

Filed Jan. 30, 1945                                    2 Sheets-Sheet 1

Inventor
Calvin W. Redekopp,
Attorneys

Oct. 18, 1949.  C. W. REDEKOPP  2,484,959
ELECTRIC WELDING APPARATUS
Filed Jan. 30, 1945  2 Sheets-Sheet 2
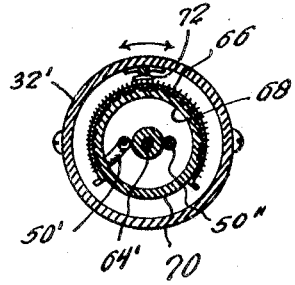
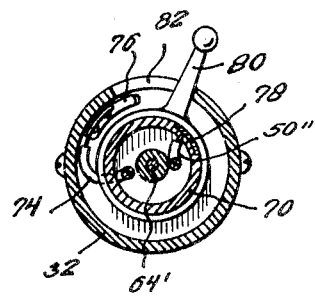
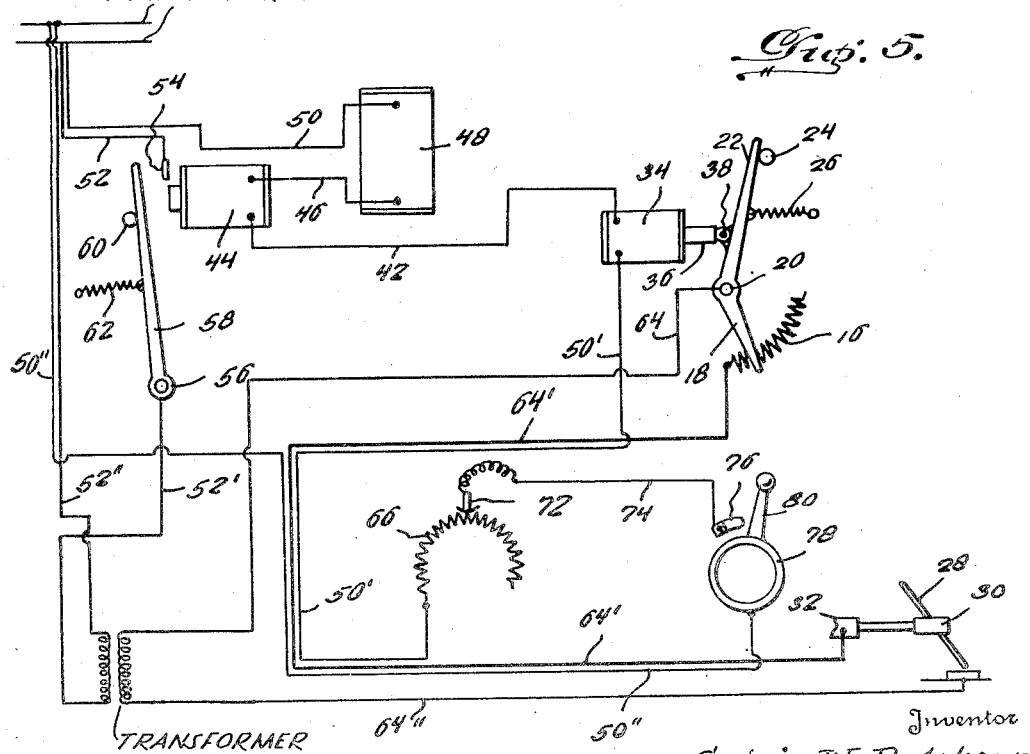
Inventor
Calvin W. Redekopp,
Attorneys Patented Oct. 18, 1949

2,484,959

UNITED STATES PATENT OFFICE 2,484,959

ELECTRIC WELDING APPARATUS

Calvin Waldo Redekopp, Butterfield, Minn.

Application January 30, 1945, Serial No. 575,264

2 Claims. (Cl. 323—94)

This invention appertains to improvements of electric welding apparatus generally, and more particularly to an auxiliary current regulating means therefor.

In electrical welding operations, current supplied to the welding electrode has heretofore been controlled by means of a voltage regulator, usually a field rheostat, located on the apparatus, or on a control panel mounted thereon. At the start of a welding operation, this regulator is set by the operator at a point where a desired voltage will be impressed on the electrode. If, during an operation, the value of the current changes, it becomes necessary that the operator adjust the regulator in order to restore the current to that value required for the continuance of the job being worked upon. This procedure takes the operator's attention from the work and results in a loss in time, especially when the job is being performed at a distance from the welding apparatus.

It is therefore the general object and purpose of the instant invention to provide a comparatively simple but highly efficient means to enable the operator of welding apparatus to turn the welding current off and on and regulate the current value at the welding electrode, thus avoiding the aforesaid detracting of his attention from the work and loss in working time, which advantage is gained by providing a manually-operated remote control switch and a manually-adjustable variable resistor in the handle of the electrode holder and operatively inter-connecting such remote control switch and resistor with the master switch and amperage regulator of the welding apparatus, the actuator of the switch being located at a point convenient for manipulation by the hand of the operator in which the electrode holder is held and the manual control of the variable resistor being accomplished by relative rotation of two parts of the handle.

With this and other objects and advantages in view, the invention resides in the certain new and useful combination, construction, and arrangement of parts and circuits, as will be hereinafter more fully described, set forth in the appended claims, and illustrated in the accompanying drawings, in which:

Figure 3 is an enlarged transverse section, taken through the line 3—3 on Figure 2, looking in the direction of the arrows;

Figure 4 is a view similar to that of Figure 3, but taken through the line 4—4 on Figure 2, looking in the direction of the arrows; and Figure 5 is a diagram of the circuit connections of the welding machine and the main and auxiliary current regulating means.

Figure 1:
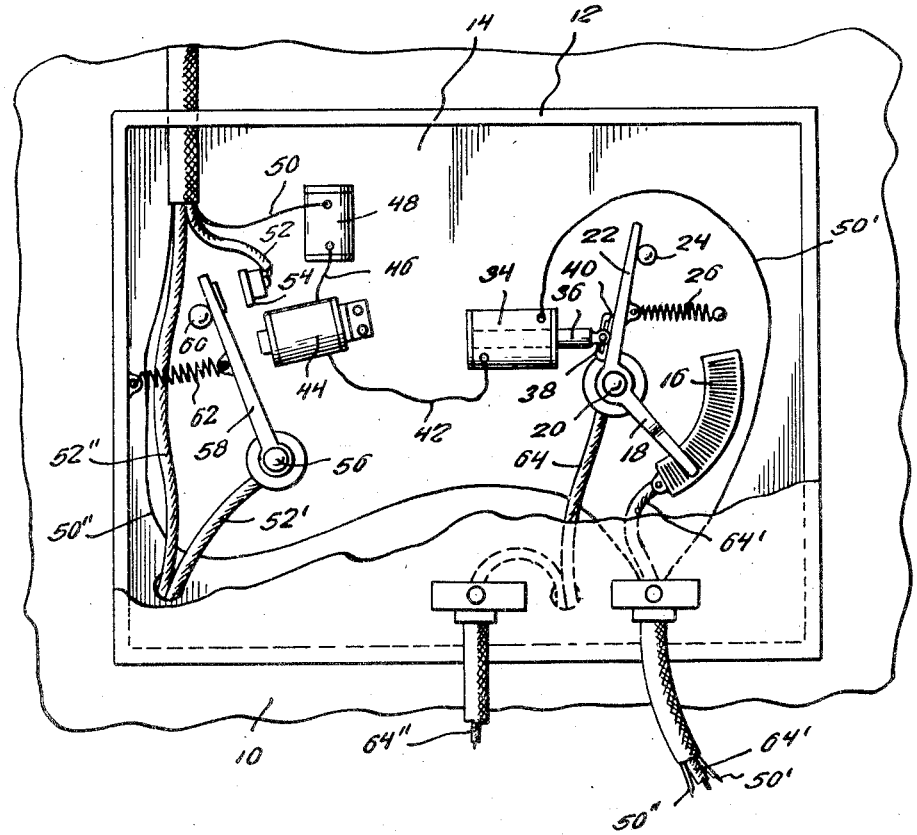
Figure 1 is a fragmentary side elevation of the control panel of an electrical welding apparatus and of a casing mounted thereon to house the master control rheostat and the automatic operating means therefor, in accordance with the invention, a portion of the front wall of the casing being broken away to show the rheostat and operating means and the circuit connections of the same.

Referring in detail to the drawings, wherein like characters of reference denote corresponding parts in the several views, the invention, as it is exemplified therein, is to be applied to any standard make of arc welding current generator, indicated at 10, and, to such end, a casing 12, enclosing a control panel 14, is mounted thereon to house the usual variable resistor, for varying the amperage of the current impressed on the welding electrode 28 (Figure 5); the resistor comprising a rheostat element 16, a contact arm 18, pivoted as at 20, for movement relatively to the rheostat by an actuating arm or handle 22, the latter being normally held against a stop 24, by means of a coiled spring 26, in which position, the contact arm 18 is disposed in its low or nearly "off" position on the rheostat.

In carrying out the objects and purposes of the invention, the control rheostat is to be automatically operated from a remote control manual switch and variable resistor mounted in the handle 32 of the holder 30 (Figures 2 and 5) for the electrode 28, instead of being manually operated from the handle 22, and, to such end, an electromagnet, preferably a solenoid 34, is mounted on the panel 14, with its movable core 36 connected to the handle 22, by means of a moving pivot connection, consisting of a cross-pin 38 and a slotted offset 40, from the handle 22, on the side of the latter opposite the point of connection of the coiled spring 26 therewith. One terminal of the solenoidal coil 34 is connected by a conductor 42 to one terminal of an electromagnet 44, which has its other terminal connected by a conductor 46 to one terminal of a fixed resistance 48, the remaining terminal of the latter being, in turn, connected to a conductor 50, branching off from the positive lead 52, of a connecting means electrically connecting the generator with a power-line.

The electromagnet 44, together with the fixed resistance 48 and a fixed contact 54, are bracketed on the panel 14, to one side of solenoid 34 and the rheostat 16, and the main line lead 52 connects with the fixed contact 54. Pivotally mounted on the panel 14, as at 56, is a contact arm 58, which extends across the core of the electromagnet 44 and the fixed contact 54, for cooperation therewith; the contact arm being normally held from engagement with the fixed contact and against a stop 60, by a coiled spring 62. A main line lead 52' extends from the pivot 56, of the contact arm 58, and, together with the other main line lead 52", passes into the welding apparatus or machine, for connection with the usual transformer housed therein. Leads 64 and 64", from the transformer, pass from the apparatus or machine, the lead 64 for connection with the pivot 20, of the contact arm 18, and the lead 64" with a ground clip (not shown) for its attachment to the work. A main lead 64' extends from the resistance element 16, of the rheostat, and connects with the electrode 28, carried in the holder 30.

Figure 2:
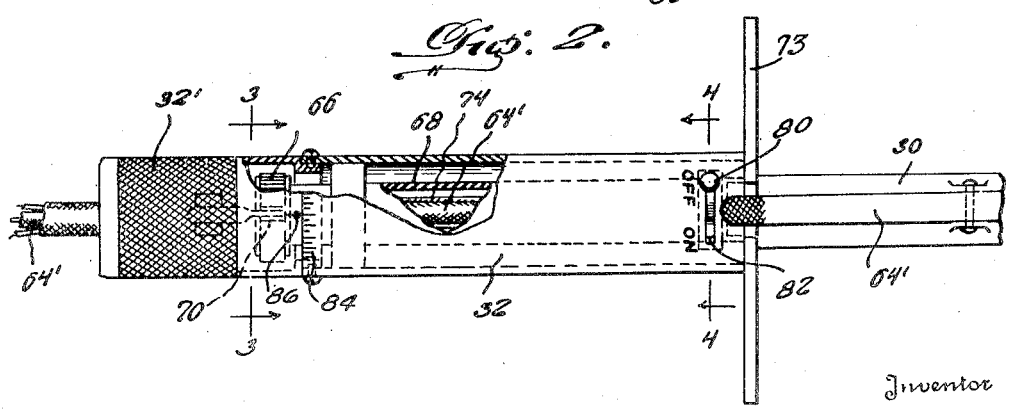
Figure 2 is a top plan view of the handle of the electrode holder, showing the manner of application of the manual control switching means therein.

The manual switching means for regulating the current applied to the electrode 28, as before stated, is mounted within the handle 32, of the holder 30, and, as shown in Figures 2 through 4, the handle is made hollow and formed to provide a rotatable portion 32', at its rear end, in the connected end of which, a wiper contact 72 is mounted for cooperation with a resistance 66 that, in turn, is mounted on the adjacent end of a tubular support 68, formed of insulating material and extending rearwardly through the handle part 32 from a point of attachment with a guard plate 73, fixed on the forward end of the latter. The contact 72 is connected by a conductor 74 to a fixed contact 76, mounted within the forward end of the handle part 32. Cooperative with the fixed contact 76 is a movable contact member 78, which is mounted on the tubular support 68 (Figure 4) and provided with a finger piece 80, projecting outwardly through a circumferentially elongated slot 82, formed in the handle part 32, immediately in rear of the guard plate 73, so as to be convenient for actuation by the thumb or a finger of the operator. A scale 84, preferably calibrated in amperes, is provided on the connected end of the handle part 32 and an index 86 on the like end of the rotatable handle part 32' for cooperation therewith. A conductor 50', leading from the remaining terminal of the solenoidal coil 34, connects with one end of the resistance 66, while a conductor 50", companion to the conductors 50, 50', leads from the movable contact member 78 and connects with the opposite side of the main power line. The conductors 50', 50", and 64', may take the form of a cable extending between the terminals of the welding apparatus and the electrode holder 30, the same passing centrally through the handle from the rear end thereof for the connection of the conductors 50' and 50" with the resistance 66 and the movable contact 78, respectively, and the conductor 64' with the electrode holder 30.

With the parts, instrumentalities and circuits, as thus constructed and arranged, the main power line is normally open on the welding apparatus at the contacts 54 and 58 and the control circuit at the contacts 76 and 78, while the contact arm 18, of the master control rheostat, will be at an "ON" position, relatively to the resistance 16. At the start of a welding operation, all that the operator needs to do, is to grasp the handle 32, of the electrode holder 30, and actuate the finger piece 80 to close the control circuit at the contacts 76 and 78. With the closing of the contacts 76 and 78, current from one side of the main power line, preferably the positive side thereof, will flow through the conductor 50 to one terminal of the solenoidal coil 34, by way of the resistance 48, conductor 46, magnet coil 44, and conductor 42. From the other terminal of the solenoidal coil 34, the current will flow to the resistance 66, by way of the conductor 50', and from the resistance to the other side of the main power line, by way of the movable contact 72, conductor 74, fixed contact 76, movable contact 78, and the conductor 50". With this flow of the control current, the electromagnet 44 will be energized and act to close the contact arm 58 on the fixed contact 54, when current from the main power line will pass to and through the transformer (not shown), of the apparatus, by way of the lead 52, the fixed contact 54, the contact arm 58, the conductor 52', the transformer terminals, and the other main line lead 52". From the output terminals of the transformer, the welding current will flow by way of the conductor 64, contact arm 18, resistance 16, conductor 64', holder 30, to the electrode 28 and the work and the conductor 64". By setting the index 86 to a desired indication on the scale 84, the control current flowing through the solenoidal coil 34 will cause the movable core 36 to adjust the contact arm 18 relatively to the resistance 16 for the application of the indicated current strength to the electrode 28 and the work. Upon opening the control circuit at the contacts 76 and 78, that circuit and the power circuit will be opened.

From the foregoing full description of my invention, it will be obvious that I have provided a simple but effective means for controlling the strength of a welding current from the welding electrode holder, so that the operator does not have to take his attention from the work being performed to make an adjustment in the current strength, regardless of the remoteness of the work from the welding apparatus.

What I claim is:

1. In electric welding apparatus including a master switch controlling the operation of such apparatus and a variable resistance device controlling the amperage of the welding current output of the apparatus, resilient means connected to said master switch urging the latter to open position, resilient means connected to said variable resistance device urging the latter to a minimum resistance position, a first electric solenoid connected to said master switch for closing the latter, a second electric solenoid connected to said variable resistance device for increasing the electrical resistance of the latter, a manually-operated, remote-control switch, a manually-operated, variable-resistance device contiguous to said manually-operated switch, a source of solenoid operating electric current, and conductor means connecting said first and second solenoids, said manually-operated switch and said manually-operated, variable-resistance device with such source of electric current and in series with each other, whereby said first solenoid operates said master switch in response to operation of said manually operated switch at any operative setting of said manually operated variable resistance device and, with said manually operated switch closed, said manually operated variable resistance device controls the setting of said solenoid operated variable resistance device.

2. In electric welding apparatus including a master switch controlling the operation of such apparatus and a variable resistance device controlling the amperage of the welding current output of the apparatus, resilient means connected to said master switch urging the latter to open position, resilient means connected to said variable resistance device urging the latter to a minimum resistance position, a first electric solenoid connected to said master switch for closing the latter, a second electric solenoid connected to said variable resistance device for increasing the electrical resistance of the latter, a manually-operated, remote-control switch, a manually-operated, variable-resistance device contiguous to said manually-operated switch, a source of solenoid operating electric current, conductor means connecting said first and second solenoids, said manually-operated switch and said manually-operated, variable-resistance device with such source of electric current and in series with each other, whereby first solenoid operates said master switch in response to operation of said manually operated switch at any operative setting of said manually operated variable resistance device and, with said manually operated switch closed, said manually operated variable resistance device controls the setting of said solenoid variable resistance device, and a fixed resistance in said conductor means in series with said solenoids, said manually-operated switch and said manually-operated, variable-resistance device.

CALVIN WALDO REDEKOPP.

REFERENCES CITED

The following references are of record in the file of this patent:

UNITED STATES PATENTS

| Number | Name | Date |
|---|---|---|
| 818,361 | Eastwood | Apr. 17, 1906 |
| 1,367,845 | Turbayne | Feb. 8, 1921 |
| 1,664,022 | Churchward | Mar. 27, 1928 |
| 1,754,353 | Endebak | Apr. 15, 1930 |
| 1,948,377 | Hacker | Feb. 20, 1934 |
| 2,043,331 | Notvest | June 9, 1936 |
| 2,117,035 | Oesterlein | May 10, 1938 |
| 2,425,183 | Hall | Aug. 5, 1947 |

FOREIGN PATENTS

| Number | Country | Date |
|---|---|---|
| 461,639 | Great Britain | Feb. 22, 1937 |